US010297355B1

(12) United States Patent
Riddle et al.

(10) Patent No.: US 10,297,355 B1
(45) Date of Patent: May 21, 2019

(54) REDUCTION-OXIDATION OF ACTINIDES EXTRACTION PROCESS (ROANEX) FOR USED NUCLEAR FUEL RECYCLING

(71) Applicant: Energy, United States Department of, Washington, DC (US)

(72) Inventors: Catherine Lynn Riddle, Idaho Falls, ID (US); Patricia D. Paviet, North Potomac, MD (US)

(73) Assignee: U.S. Department of Energy, Washington, DC (US)

( * ) Notice: Subject to any disclaimer, the term of this patent is extended or adjusted under 35 U.S.C. 154(b) by 405 days.

(21) Appl. No.: 15/378,191

(22) Filed: Dec. 14, 2016

(51) Int. Cl.
  *G21C 19/46* (2006.01)
  *C22B 60/02* (2006.01)
  *C01B 13/18* (2006.01)
  *C01G 56/00* (2006.01)

(52) U.S. Cl.
  CPC ............ *G21C 19/46* (2013.01); *C01B 13/185* (2013.01); *C01G 56/001* (2013.01); *C22B 60/026* (2013.01); *G21Y 2002/50* (2013.01); *G21Y 2004/60* (2013.01); *Y02W 30/883* (2015.05)

(58) Field of Classification Search
  CPC ........ G21C 19/42; G21C 19/44; G21C 19/46; C22B 60/026; Y02W 30/883; C01G 56/00; C01G 56/001; C01B 13/185
  See application file for complete search history.

(56) References Cited

U.S. PATENT DOCUMENTS

| | | | | | |
|---|---|---|---|---|---|
| 4,162,230 | A | * | 7/1979 | Horwitz | C01F 17/0006 252/640 |
| 4,208,377 | A | * | 6/1980 | Horwitz | C22B 3/0062 423/8 |
| 5,011,822 | A | * | 4/1991 | Barder | C01B 13/185 252/519.21 |
| 7,291,316 | B2 | * | 11/2007 | Meikrantz | C22B 3/002 210/682 |

(Continued)

OTHER PUBLICATIONS

Riddle, Catherine L., et al. "Fission product extraction (FPEX): Development of a novel solvent for the simultaneous separation of strontium and cesium from acidic solutions." Solvent extraction and ion exchange 23.3 (2005): 449-461. Abstract attached. (Year: 2005).*

*Primary Examiner* — Lily C Garner
(74) *Attorney, Agent, or Firm* — Karen L. Blouin; Michael J. Dobbs; Brian J. Lally

(57) ABSTRACT

The invention relates to the ROANEX method, which extracts actinides from used nuclear fuel in a single purification cycle. The used nuclear fuel contains actinides, U, Am, Pu, Np. and Cm, and fission products, Cs, Sr and Tc. The fission products are separated first from the used nuclear fuel. The actinides are reduced to their lowest oxidation states and then oxidized to their highest oxidations states. Uranium, Pu and Np move to an organic phase solution and Am and Cm move to a nitrate solution. Uranium, Pu, and Np are stripped from the organic phase solution, and then treated with an oxalic acid to form a precipitate. Americium and Cm are treated with a potassium carbonate solution and Am precipitates. Actinides Am, U, Pu, and Np precipitates are heated in an oven and then blended together to form a mixed oxide fuel of $UO_2$, $PuO_2$, $NpO_2$ and $AmO_2$.

21 Claims, 2 Drawing Sheets

(56) References Cited

U.S. PATENT DOCUMENTS

| | | | | |
|---|---|---|---|---|
| 7,524,469 B2 * | 4/2009 | Meikrantz | ............... | C22B 3/002 |
| | | | | 210/634 |
| 8,158,088 B2 * | 4/2012 | Peterman | ............. | C07D 323/00 |
| | | | | 210/634 |

* cited by examiner

REDUCTION-OXIDATION OF ACTINIDES EXTRACTION PROCESS (ROANEX) FOR USED NUCLEAR FUEL RECYCLING

GOVERNMENT INTERESTS

The United States Government has rights in this invention pursuant to Contract No. DE-AC07-05-ID14517, between the U.S. Department of Energy (DOE) and Idaho National Laboratory.

FIELD OF INVENTION

The present invention relates to a method for processing used nuclear fuel by the Reduction-Oxidation of Actinide Extraction Process (ROANEX). Specifically, the method according to the invention makes it possible to obtain separation of actinides and fission products in a single purification process.

BACKGROUND OF THE INVENTION

The disposition of waste from the recycling of nuclear fuel is a major problem in the nuclear power industry. Currently, there are a variety of recycling schemes to recover key actinides and transform fission products into durable waste forms. Because of the creation of multiple waste streams, the UREX (Uranium Refining by EXtraction) method is no longer a viable system for actinide recovery and fission product separation. The PUREX (Plutonium Uranium Refining by EXtraction) process is currently used in many countries for recycling used nuclear fuel with the only other alternative for used fuel being direct storage in a geological repository. The PUREX method recovers and separates uranium (U) and plutonium (Pu) present in spent fuel. This method cannot be performed in the U.S. due to the separation of Pu which violates the non-proliferation agreement.

Used Nuclear Fuel (UNF) is extremely hazardous; consequently new advanced recycling technologies are pursued to limit the hazards of UNF. Specifically, technetium-99 (Tc-99) is of particular concern. As a pertechnatate ion, it is very mobile in the environment and has an extremely long half-life. Furthermore, cesium (Cs) and strontium (Sr)are heat generating nuclides and have short half-lives. Separation of these fission products will ultimately decrease the need for long term and short term storage in geological repositories.

The PUREX method contains a series of steps in order to extract and separate U and Pu from the fission product impurities. The first cycle decontaminates U and Pu from Americium (Am) and Curium (Cm), as well as other fission products. The second cycle extracts U and Pu into an organic phase containing tri-n butyl phosphate (TBP), The organic phase enters the fission product scrub section to remove fission product impurities. Pu is reduced to a lower oxidation state and stripped from U. The U and Pu products are further processed with additional cycles to purify the products. Other known technologies require separate techniques for separating other actinides from fission product impurities. For example, Am and Cm are actinides left behind in the fission product impurities through the PUREX method. Therefore, leaving out Am for a potential production of a mixed oxide (MOX) fuel.

Furthermore, the PUREX method uses a solution containing a reductant to lower the oxidation state of Pu. In the industry, several reductants may be used. The UREX method used reductants acetohydroxamic acid (AHA) or formohydroxamic acid (FHA). These acids will form a decomposition product called hydroxylamine nitrate (HAN). The HAN decomposition product is potentially explosive. It was proven that the HAN decomposition product s responsible for destroying a Hanford site lab in 1997, These decomposition products have the potential for producing catastrophic failure in a recycling plant endangering lives, property, and the environment.

Although various recycling methods are known to the art, all, or most of them suffer from one or more than one disadvantage. There is a need to provide a method for improved recycling of used nuclear fuel.

It is, therefore, the purpose of this invention to provide safe and economical disposal of spent fuel to ensure a stable and economical energy supply for the future. The ROANEX method provides a simpler method for recycling used nuclear fuels.

SUMMARY OF THE INVENTION

According to one aspect of the invention, a method for processing used nuclear fuel in a single purification cycle includes diluting the fuel into a nitric acid solution ($HNO_3$) to form a first solution. The used nuclear fuel contains a plurality of actinides and a plurality of fission products with the plurality of actinides including at least U(VI), Am(III), Pu(IV,V,VI), Neptunium (Np) (IV, V, VI), and Cm (III) and the plurality of fission products including at least Cs, Sr and Tc (VII), The concentration of the nitric acid in the first solution is approximately equivalent to a first predetermined molarity. The fission products Cs and Sr are separated from the first solution. The first solution is diluted to form a second solution with a concentration of nitric acid approximately equivalent to a second predetermined molarity. Tc(VII) is removed from the second solution to form a third solution. The third solution is adjusted to form a fourth solution with a concentration of nitric acid approximately equivalent to a third predetermined molarity. A reductant is added to the fourth solution to form a reduction phase solution which includes at least U(III), Am(III), Pu(III), Np(IV), and Cm(III). An oxidant s added to the reduction phase solution to form an oxidation phase solution which includes at least U(VI), Am(V or VI), Pu(IV), Np (IV), and Cm (III). An extractant solution is added to the oxidation phase solution to form an organic phase solution and a nitrate solution with the nitrate solution including at least Am(V or VI) and Cm(III). U(VI), Pu(IV), and Np(IV) are stripped from the organic phase solution to form an aqueous phase solution. A predetermined acid is added to the aqueous phase solution to form a precipitate. The precipitate is heated to form a first mixed oxide fuel (MOX) which includes at least $UO_2$, $PuO_2$, and $NpO_2$.

The method further comprises the steps of adding a potassium carbonate solution ($K_2CO_3$) to the nitrate solution to form a $K_2AmO_2(CO_3)_2$ salt precipitate. The potassium carbonate solution is filtered with $HNO_3$ to form a Cm solution having a molarity approximately equivalent to a fourth predetermined molarity. An oxalic acid is added to the Cm solution to form a Cm oxalate precipitate. The $K_2AmO_2(CO_3)_2$ salt precipitate is heated to form an americium oxide ($AmO_2$). The americium oxide is blended with the first MOX to form a second. MOX which includes at least $UO_2$, $PuO_2$, $NpO_2$ and $AmO_2$.

Other advantages and characteristics of the method of the invention will become apparent upon reading the additional description which follows and which refers to the objects of the present invention.

BRIEF DESCRIPTIONS OF THE DRAWINGS

An embodiment of a method in accordance with the invention will by way be described in detail with reference to the accompanying drawings. In the drawings.

DETAILED DESCRIPTION OF THE INVENTION

Figure 1:
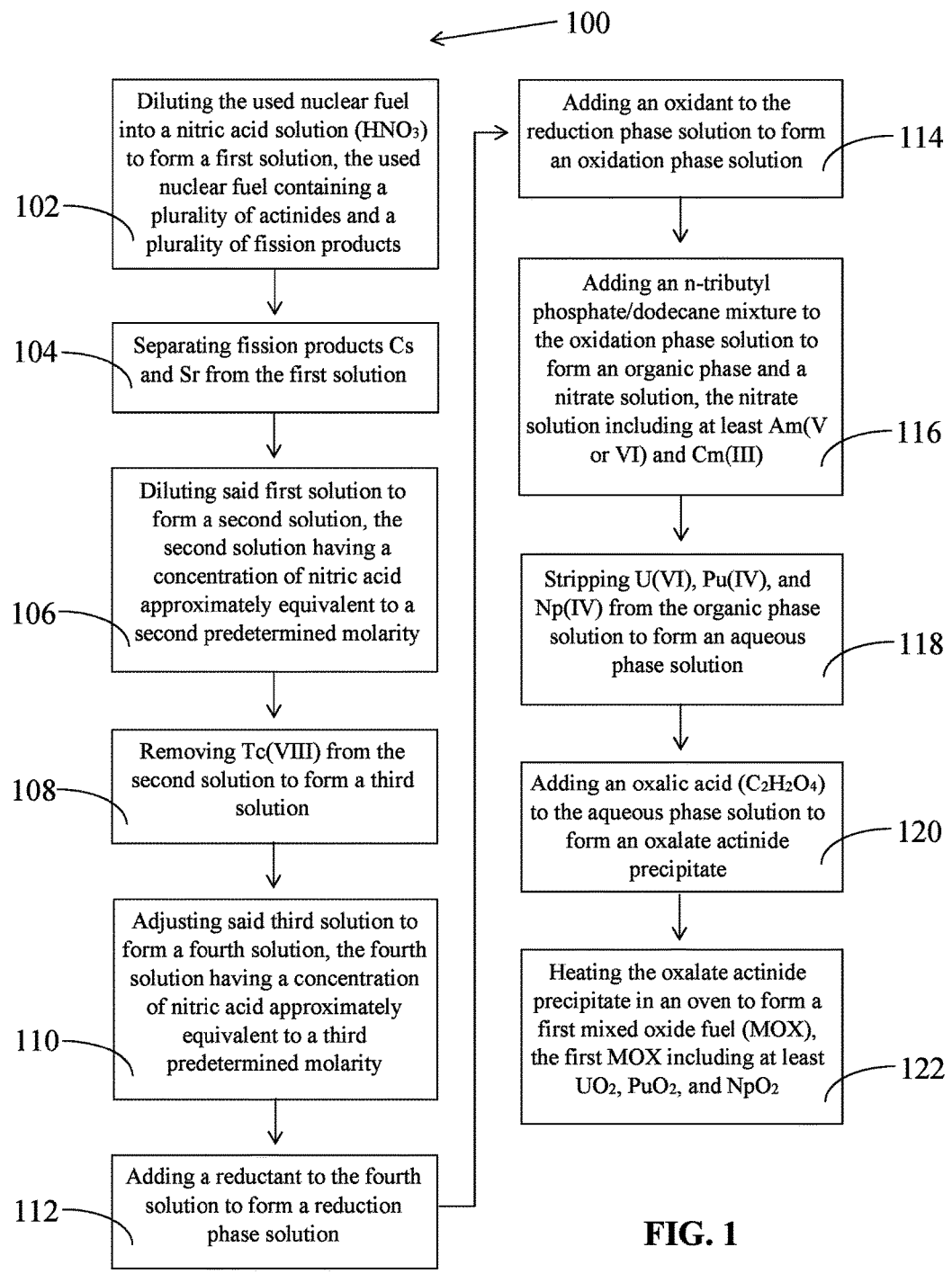
FIG. 1 depicts a flow diagram illustrating steps in a process for obtaining a mixed oxide fuel from used nuclear fuel in a single purification cycle.

FIG. 1 is a schematic block diagram illustrating the ROANEX method 100 according to the invention.

In step 102, used nuclear fuel is diluted in nitric acid ($HNO_3$) to form a first solution. The used nuclear fuel contains a plurality actinides and a plurality fission products. Actinides are any of the fifteen metallic elements from actinium to lawrencium. Actinides present in the used nuclear fuel may include U(VI), Am(III), Pu(IV,V,VI), Np(IV,V,VI), and Cm(III). The most abundant actinides in used nuclear fuel, including thorium (Th) based reactors, are U and Pu. Fission products are any of the elements from zinc through the lanthanides. Fission products present in used nuclear fuel may include Cs, Sr, and Tc(VII). In alternate embodiments used nuclear fuels may have different chemical compositions. For example, Th-232 fueled nuclear reactors will breed U-233 and produce Pa-231 via (n,2n) reactions with Th-232. Natural spent uranium fuel produces U-238, U-235, and traces U-234.

The concentration of nitric acid ($HNO_3$) in the first solution is adjusted to a first predetermined molarity. In a first embodiment the first predetermined molarity is approximately 1 to 3 M. Alternate embodiments may have nitric acid ($HNO_3$) concentrations with molarities of other than 1 to 3 M. Any molarity value is acceptable if it allows Cs and Sr fission products to separate out in step 104.

In step 104, Cs and. Sr fission products are separated from the first solution thereby limiting the heat generated by the two fission products. A first embodiment may use the FPEX (Fission Product EXtraction) process to separate Cs and Sr from the first solution. Alternate embodiments may use separation processes other than the FPEX process.

In step 106, the first solution is diluted with a liquid to form a second solution. The second solution has a concentration of nitric acid ($HNO_3$) of a second predetermined molarity. The first solution may be diluted with distilled water or any other liquid that produces the desired result. In a first embodiment the second predetermined molarity is approximately 0.01 M ($HNO_3$). Alternate embodiments may have nitric acid ($HNO_3$) concentrations with molarities other than 0.01 M ($HNO_3$). Any molarity is acceptable such that Tc(VII) is absorbed by the ion exchange resin in step 108. The second solution may include U(VI), Am(III), Pu(IV,V,VI), Np(IV,V,VI), Cm(III) and Tc(VII). Alternate embodiments may include different actinides and fission products, the precise composition depending on the type of used nuclear fuel.

In step 108, Tc(VII) is removed from the second solution to form a third solution. In a first embodiment the third solution is formed when the second solution flows through a column of an anion exchange resin. Alternate embodiments may use removal processes other than an anion exchange resin, for example, liquid-liquid extraction equipment, mixer settlers, columns, centrifugal contactors, or similar type equipment known to those skilled in the art. Tc(VII) may be absorbed as pertechnatate ($TcO_4$) by the anion exchange resin. After the Tc(VII) is removed, an aqueous stream that contains no Tc remains. If the user desires, the near chemically pure Tc may be converted to Tc metal and into a final waste form.

The third solution may include U(VI), Am(III), Pu(IV,V, VI), Np(IV,V,VI), and Cm(III). Alternate embodiments may include different actinides and fission products, the precise composition depending on the type of used nuclear fuel.

In step 110, the molarity of nitric acid of a third solution is adjusted to be approximately equivalent to a third predetermined molarity to form a fourth solution. In one embodiment the molarity of nitric acid in the fourth solution is approximately 1 M. Alternate embodiments may have nitric acid concentrations with molarities other than 1 M $HNO_3$. The molarity of the fourth solution is chosen such that the plurality actinides reduce in step 112. Thus, the precise molarities can be readily determined by one skilled in the art. In a first embodiment, the fourth solution may include U(VI), Am(III), Pu(IV,V,VI), Np(IV,V,VI), and Cm(III). Alternate embodiments of the fourth solution may include different actinides, the precise composition of the fourth solution depending on the type of spent nuclear fuel.

In step 112, a reductant is added to the fourth solution to form a reduction phase solution. In one embodiment, the reductant is a hydrazine derivative called hydroxyethylhydrazine (HEH). The HEH reduces the plurality of actinides to their preferred oxidation states. Alternate embodiments may use a reductant other than HEH, such as hydroxylamine (HAN), acetohydroxamic acid (AHA) or formohydroxamic acid (FHA) such that the reductant HEH does not form a third phase or pressurize over time possibly causing an explosion. In a first embodiment the reduction phase solution may include U(III), Am(III), Pu(III), Np(IV) and Cm(III). Alternate embodiments of the reduction phase solution may include different actinides, the precise composition of the reduction phase solution depending on the type of used nuclear fuel.

In step 114, an oxidant is added to the reduction phase solution to form an oxidation phase solution. An oxidant will oxidize all actinides to their preferred and most stable states in $HNO_3$, In a first embodiment the oxidant is NOx gas. Alternate embodiments may use oxidants other than NOx, such as sodium bismuthate ($NaBiO_3$), peroxydisulfate ($S_2O_8^{2-}$), or sodium nitrite and hydrogen peroxide ($NaNO_2$/$H_2O_2$). Actinide U(III) will oxidize to U(VI), Pu(III) will oxidize to Pu(IV), Np(IV) will remain the same because this is the most favorable oxidation state, Am(III) will oxidize to Am(V or VI) and Cm(III) will stay in the trivalent state. In alternate embodiments the oxidation of Am(III) may vary, for example, Am(III) may oxidize completely to Am(VI), completely to Am(V) or both Am(V) and Am(VI). The oxidant is chosen such Pu and Np will not go to the higher oxidation state of Pu and Np.

In step 116, the oxidation phase solution is brought into contact with an organic extractant solution forming an organic phase solution and a nitrate solution. The organic extractant solution moves U(VI), Pu(IV), Np(IV) into the organic phase solution and Am(V) and Cm(III) into the nitrate solution, Alternate embodiments may have different actinides in the organic phase and nitrate solutions. In an embodiment in which Am(III) completely oxidizes to Am(VI), then it will follow U(VI), Pu(IV), Np(IV) into the organic phase solution and only Cm(III) will move into the nitrate solution. Alternately, in an embodiment in which Am(III) oxidizes to both Am(V) and Am(VI), Am(VI) will follow U(VI), Pu(IV), Np(IV) into the organic phase and Am(V) and Cm(III) will move into the nitrate solution. The precise compositions of the organic phase solution and nitrate solution depends on the oxidation states of the plurality actinides in step 114.

In a first embodiment, the organic extractant solution is an n-tributyl phosphate/dodecane (TBP/dodecane) mixture. The concentration of TBP can range from 20-40%. Preferably, the TBP/dodecane ratio is approximately 30% MP and approximately 70% dodecane. Alternate embodiments may use organic extractant solutions other than TBP/dodecane. For example, dodecane may be replaced with any isoparaffinic hydrocarbon, e.g. Isopar™ L. Thus, the precise organic extractant solution and concentration will depend on the separation of U(VI), Pu(IV), Np(IV) and possibly Am(VI) into the organic phase solution.

In step 118, actinides U(VI), Pu(IV) and Np(IV) are stripped from the organic phase solution to form an aqueous phase solution. The aqueous phase solution may include U(VI), Pu(IV), Np(IV) and nitric acid ($HNO_3$). The actinides may be stripped by bringing the organic phase solution into contact with nitric acid ($HNO_3$). The molarity of the nitric acid ($HNO_3$) in the aqueous solution may be approximately equivalent to 0.1 M $HNO_3$. Stripping occurs due to Le Châtelier's principle or "The Equilibrium Law" when a higher concentration of an acid contacts a lower concentration of an acid. Alternate embodiments may have concentrations of nitric acid ($HNO_3$) with molarities other than 0.1 M $HNO_3$. Preferably, the molarity of the aqueous phase solution is such that the actinides U(VI), Pu(IV) and Np(IV) are stripped from the organic phase solution.

Alternate embodiments of the organic phase solution may include the actinide Am(VI) In those embodiments, when the organic phase solution is brought into contact with nitric acid ($HNO_3$), Am(VI) along with U(VI), Pu(IV), and Np(IV) are stripped from the organic phase solution and form an aqueous phase solution. The aqueous phase solution may include U(VI), Pu(IV), Np(IV), Am(VI) and nitric acid ($HNO_3$).

In step 120, the aqueous phase solution is brought into contact with a predetermined acid. This forms a precipitate. The precipitate may include actinides U(VI), Pu(IV), and Np(IV). Alternate embodiments of the aqueous phase solution may also include actinide Am(VI). In a first embodiment the acid is oxalic acid ($C_2H_2O_4$). In the first embodiment the precipitate is an oxalate actinide precipitate. The oxalate actinide precipitate may include U(VI), Pu(IV), Np(IV), and Am(VI), Thus, the precise aqueous phase solution composition depends on the oxidation states of the plurality of actinides in step 114

Alternate embodiments may use acids other than oxalic acid, for example, salicylic acid, aminocarboxylic acid, ethylenediaminetetraacetic acid, hexacyanoferric acids, and formic acid. Preferably, oxalic acid is used since it stabilizes all of the actinides of interest and eliminates additional steps such as filtering and intermediate stages.

In step 122, the precipitate is heated in order to form a first mixed oxide fuel (MOX). In a first embodiment, the oxalate actinide precipitate is heated in an oven. The temperature of the oven may be set from 400° C. to 650° C. Preferably, the oxalate actinide precipitate is heated for a few hours. For example, a few hours may vary from two, four, six or more or however long is needed for the oxalate actinide precipitate to form into the first MOX. The first MOX may be composed of $UO_2$, $PuO_2$, and $NpO_2$. Alternative embodiments may contain other actinides in the oxalate actinide precipitate, for example, Am(VI).

Figure 2:
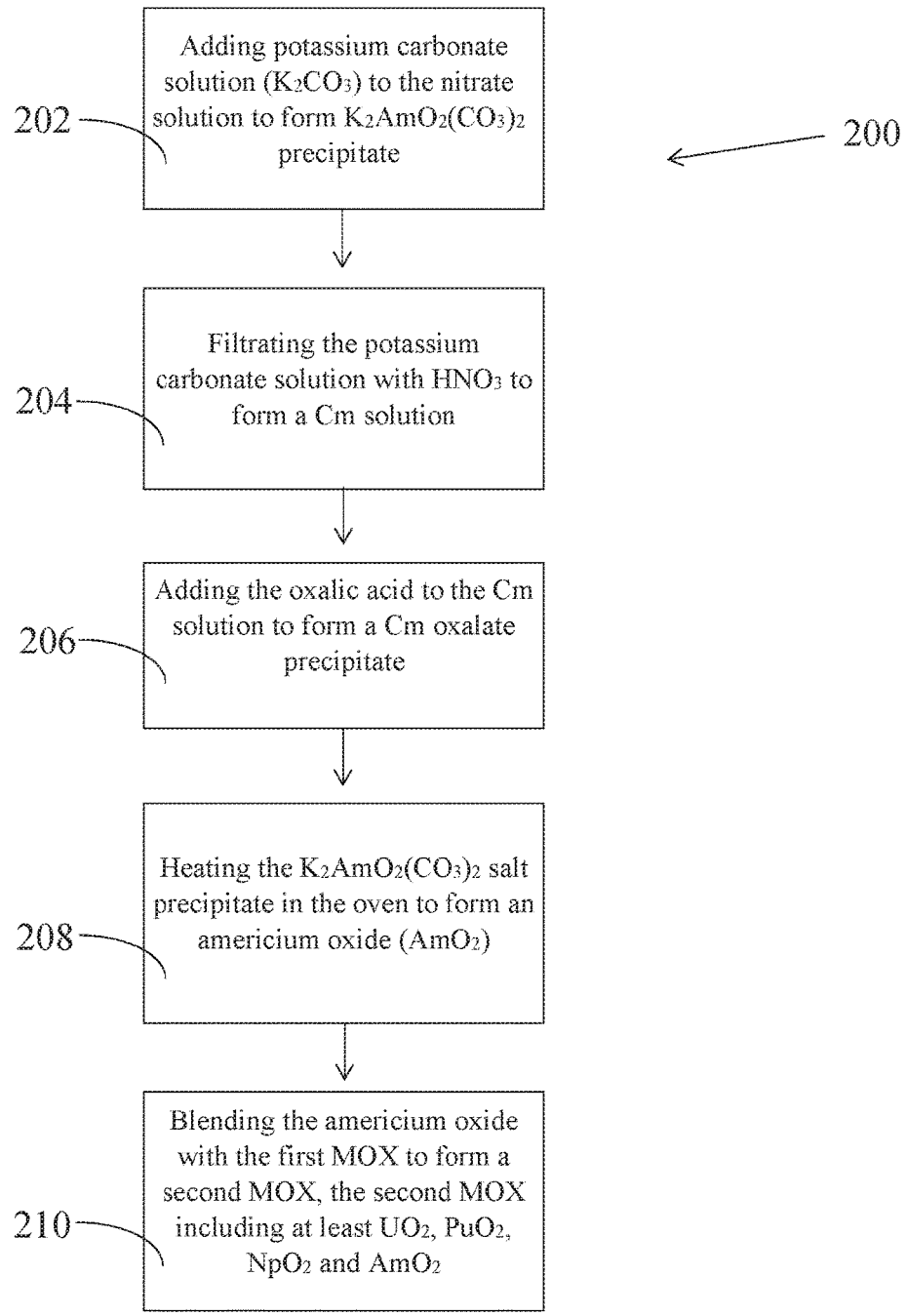
FIG. 2 depicts a flow diagram illustrating additional steps in a process for obtaining a mixed oxide fuel from used nuclear fuel in a single purification cycle.

FIG. 2 depicts a flow sheet showing the portion of the ROANEX method 200 which separates Cm from Am to blend Am into the first MOX. In step 202, the nitrate solution from step 116 is brought into contact with a potassium carbonate solution ($K_2CO_3$). This forms a $K_2AmO_2(CO_3)_2$ salt precipitate. Actinide Am(VI) forms into $K_2AmO_2(CO_3)_2$ salt precipitate and Cm(III) will remain the same. The concentration of the potassium carbonate solution may be 3.5 M or any concentration yields a $K_2AmO_2(CO_3)_2$ salt precipitate. Alternative embodiments may use other salts other than potassium carbonate solution.

Alternative embodiments of the nitrate solution may include Am(V) and Cm(III). As outlined above, in step 114, Am(III) may oxidize to either Am(V), Am(VI), or both. If Am(III) completely oxidized to Am(VI), Am(V) will not be present in the nitrate solution and step 202 will not be necessary. If Am(III) oxidizes to Am(V), Am(V) will be present in the nitrate solution and step 202 will be necessary in order to form the $K_2AmO_2(CO_3)_2$ salt precipitate.

In step 204, the potassium carbonate solution is filtrated with $HNO_3$. This forms a Cm solution. The potassium carbonate solution may include Cm(III). The potassium carbonate solution is diluted to approximately 1 M $HNO_3$. Alternative embodiments of molarities of the potassium carbonate solution may be other than 1 M $HNO_3$ such that the concentration of the potassium carbonate yields a Cm solution.

In step 206, the Cm solution is brought into contact with oxalic acid. This forms a Cm oxalate precipitate. The Cm oxalate precipitate is transmutated by fissioning or disposed of as a vitrified or ceramic waste form in a repository. Alternative embodiments may use a wide range of concentrations for oxalic acid such that the concentration of the oxalic acid yields a Cm oxalate precipitate. Thus, the precise concentration can be readily determined by one killed in the art.

In step 208, the $K_2AmO_2(CO_3)_2$ salt precipitate is heated in order to form an americium oxide ($AmO_2$). The $K_2AmO_2(CO_3)_2$ salt precipitate may be heated in an oven. The temperature of the oven may be set from 400° C. to 650° C. It is preferred that the $K_2AmO_2(CO_3)_2$ salt precipitate heats in the oven for two hours. Time is dependent upon the $K_2AmO_2(CO_3)_2$ salt precipitate forming into $AmO_2$ and may take more or less. However, if Am(III) from step 114 does not completely or partially oxidize to Am(V), step 202 and step 208 may not be necessary.

In step 210. $AmO_2$ is brought into contact with the first MOX. $AmO_2$ is blended with the first MOX in order to form a second MOX. The second MOX is composed of $UO_2$, $PuO_2$, $NpO_2$ and $AmO_2$.

The method of the invention is not limited to the embodiments which have just been expressly described. Thus, for example, it is possible to complete ROANEX method 100 in conjunction with ROANEX method 200. Step 202 of ROANEX method 200 would start at the same time as step 116 of ROANEX method 100. Therefore, the step 208 would be parallel with the step 122. It is also possible to complete ROANEX method 100 first then complete ROANEX method 200 at a later time. As discussed above, parts of Am may oxidize to Am(V) or Am(VI) or both.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed:

1. A method for processing used nuclear fuel in a single purification cycle, the method comprising the steps of:
   a. diluting the used nuclear fuel into a nitric acid solution ($HNO_3$) to form a first solution, the used nuclear fuel containing a plurality of actinides and a plurality of fission products, the plurality of actinides including U(VI), Am(III), Pu(IV,V,VI), Np (IV, V, VI), and Cm (III), the plurality of fission products including at least Cs, Sr and Tc (VII), the concentration of the nitric acid in the first solution being approximately equivalent to a first predetermined molarity;
   b. separating fission products Cs and Sr from the first solution;
   c. diluting said first solution to form a second solution, the second solution having a concentration of nitric acid approximately equivalent to a second predetermined molarity;
   d. removing Tc(VII) from the second solution to form a third solution;
   e. adjusting said third solution to form a fourth solution, the fourth solution having a concentration of nitric acid approximately equivalent to a third predetermined molarity;
   f. adding a reductant to the fourth solution to form a reduction phase solution, the reduction phase solution including U(III), Am(III), Pu(III), Np(IV), and Cm(III);
   g. adding an oxidant to the reduction phase solution to form an oxidation phase solution, the oxidation phase solution including U(VI), Am(V or VI), Pu(IV), Np (IV), and Cm (III);
   h. adding an organic extractant solution to the oxidation phase solution to form an organic phase solution and a nitrate solution, the nitrate solution including Am(V or VI) and Cm(III);
   i. stripping U(VI), Pu(IV), and Np(IV) from the organic phase solution to form an aqueous phase solution;
   j. adding a predetermined acid to the aqueous phase solution to form a precipitate;
   k. heating the precipitate to form a first mixed oxide fuel (MOX), the first MOX including $UO_2$, $PuO_2$, and $NpO_2$.

2. The method of claim 1, and further comprising the steps of:
   a. adding a potassium carbonate solution ($K_2CO_3$) to the nitrate solution to form a $K_2AmO_2(CO_3)_2$ salt precipitate;
   b. filtrating potassium carbonate solution with $HNO_3$ to form a Cm solution, the concentration of the nitric acid in the Cm solution approximately equivalent to a fourth predetermined molarity;
   c. adding an oxalic acid to the Cm solution to form a Cm oxalate precipitate;
   d. heating the $K_2AmO_2(CO_3)_2$ salt precipitate to form an americium oxide ($AmO_2$);
   e. blending the americium oxide with the first MOX to form a second MOX, the second MOX including at least $UO_2$, $PuO_2$, $NpO_2$ and $AmO_2$.

3. The method of claim 1, wherein the first predetermined molarity is approximately 1-3 M $HNO_3$.

4. The method of claim 1, wherein the plurality of actinides further includes Pu.

5. The method of claim 1, wherein the step of separating Cs and Sr further includes using an FPEX (Fission Product EXtraction) process.

6. The method of claim 1, wherein the first solution is diluted with distilled water.

7. The method of claim 1, wherein the second predetermined molarity is approximately 0.01 M $HNO_3$.

8. The method of claim 1, wherein the step of removing Tc(VII) further includes passing the second solution through an anion exchange resin.

9. The method of claim 1, wherein the third predetermined molarity is approximately 1 M $HNO_3$.

10. The method of claim 1, wherein the reductant comprises a hydrazine derivative called hydroxyethylhydrazine (HEH).

11. The method of claim 1, wherein the oxidant is selected from a group consisting of NOx gas, sodium bismuthate ($NaBiO_3$), peroxydisulfate ($S_2O_8^{2-}$), or sodium nitrite and hydrogen peroxide ($NaNO_2/H_2O_2$).

12. The method of claim 1, wherein the organic extractant solution is a n-tributyl phosphate/dodecane mixture.

13. The method of claim 12, wherein n-tributyl phosphate/dodecane mixture is 30% n-tributyl phosphate and 70% dodecane.

14. The method of claim 1, wherein the step of stripping further includes diluting the organic phase solution with nitric acid, the nitric acid having a molarity of approximately 0.1 M.

15. The method of claim 1, wherein the step of heating the precipitate uses an oven.

16. The method of claim 1, wherein the oven is set to a temperature from 400° C. to 650° C.

17. The method of claim 2, wherein the $K_2CO_3$ solution has a molarity of approximately 3.5 M.

18. The method of claim 2, wherein the $K_2AmO_2(CO_3)_2$ salt precipitate is heated in an oven.

19. The method of claim 18, wherein the $K_2AmO_2(CO_3)_2$ salt precipitate is heated in the oven for approximately two hours.

20. The method of claim 1, wherein the predetermined acid is oxalic acid ($C_2H_2O_4$) and the precipitate is an oxalate actinide precipitate.

21. The method of claim 2, wherein the fourth predetermined molarity is approximately 1 M $HNO_3$.

* * * * *